US012558836B2

(12) United States Patent
Ando et al.

(10) Patent No.: US 12,558,836 B2
(45) Date of Patent: Feb. 24, 2026

(54) FIBER-REINFORCED RESIN STRAND AND ADDITIVE MANUFACTURING METHOD

(71) Applicant: KOBE STEEL, LTD., Hyogo (JP)

(72) Inventors: Taka Ando, Hyogo (JP); Makoto Takenaka, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 146 days.

(21) Appl. No.: 18/464,012

(22) Filed: Sep. 8, 2023

(65) Prior Publication Data

US 2024/0083103 A1     Mar. 14, 2024

(30) Foreign Application Priority Data

Sep. 13, 2022     (JP) ................................. 2022-145288

(51) Int. Cl.
B29C 64/118        (2017.01)
B29C 64/314        (2017.01)
B29C 70/00         (2006.01)

(52) U.S. Cl.
CPC .......... B29C 64/118 (2017.08); B29C 64/314 (2017.08); B29C 70/00 (2013.01)

(58) Field of Classification Search
CPC ..... B29C 64/118; B29C 64/30; B29C 64/307; B29C 64/314; B29C 64/321; B29C 64/336; B33Y 70/00; B33Y 70/10
See application file for complete search history.

(56) References Cited

U.S. PATENT DOCUMENTS

2020/0130276 A1*   4/2020   Ueda ...................... B33Y 30/00
2021/0237339 A1*   8/2021   Takenaka ................. C08J 5/042
2022/0220641 A1*   7/2022   Hagihara ............... B33Y 70/10

FOREIGN PATENT DOCUMENTS

JP       2021-123026  A    8/2021
WO       2018/151074  A1   8/2018

* cited by examiner

*Primary Examiner* — Andrew L Swanson
(74) *Attorney, Agent, or Firm* — Studebaker Brackett PLLC

(57)                ABSTRACT
A fiber-reinforced resin strand used as a manufacturing material for a 3D printer, the fiber-reinforced resin strand containing: a base material containing a thermoplastic resin; and at least one fiber or fiber bundle disposed in the base material and extending in a strand-axial direction. Twisting is applied to the fiber or the fiber bundle along the strand-axial direction, and the number of times of the twisting per 1 m in length of the fiber-reinforced resin strand in the strand-axial direction is 30 or more and 80 or less.

5 Claims, 5 Drawing Sheets

*FIG. 4*

PSs

W

MANUFACTURING
DIRECTION

PS

PSe

FIBER-REINFORCED RESIN STRAND AND ADDITIVE MANUFACTURING METHOD

CROSS-REFERENCE TO RELATED APPLICATIONS

This application is based on and claims priority under 35 USC 119 from Japanese Patent Application No. 2022-145288 filed on Sep. 13, 2022.

BACKGROUND OF INVENTION

Technical Field

The present disclosure relates to a fiber-reinforced resin strand and an additive manufacturing method.

Background Art

As an apparatus for molding an object having a three-dimensional shape, a three-dimensional (3D) printer, which employs fused deposition modeling in which a resin plasticized by heat is laminated one by one, has been known. The 3D printer can mold a three-dimensional shape without requiring a mold, a jig, or the like. In addition, a three-dimensional object which is difficult to be formed by an injection molding technique in the related art can also be manufactured.

A strand reported in Patent Literature 1 is a fiber-reinforced resin strand used as a manufacturing material in a 3D printer, and a fiber or a fiber bundle is impregnated and twisted in a base material containing a thermoplastic resin as a main component, thereby increasing flexibility and improving handleability. In addition, a manufactured object manufactured by the 3D printer using the fiber-reinforced resin strand exhibits excellent impact strength due to the twisting of the fiber or fiber bundle.

CITATION LIST

Patent Literature

Patent Literature 1: JP2021-123026A

SUMMARY OF INVENTION

Technical Problem

It has been reported that the continuous fiber-reinforced resin strand having a twisting number of 10 times/m to 200 times/m described in Patent Literature 1 has high flexibility, and has excellent impact strength due to a contribution of prevention of fiber breakage during manufacturing with a 3D printer, an increase in friction between fibers, and the like. However, when manufacturing (printing) a manufactured object with a 3D printer, a continuous fiber may not be formed as expected in a case where a manufacturing path is a path along a curve line.

For example, as shown in FIG. 4, when manufacturing is performed along a curve line from one path end portion PSs to the other path end portion PSe, it is ideal that a manufacturing material M is formed along a path PS with a constant spread width W. However, as shown in FIG. 5, a continuous fiber of a continuous fiber-reinforced strand heated and melted and ejected from a nozzle (an ejection portion) of a printer head may cause a fold in a curved portion of the path PS, and may deviate from the set path. In this case, a void G is generated in the manufacturing material M. A decrease in spread width W, particularly in the curved portion as shown in FIG. 6, or destabilization of the spread width W as shown in FIG. 7 may be exposed.

When the manufacturing is continued in such a state, fusibility between the manufacturing materials M decreases, a void is formed in the manufactured object, and mechanical strength is reduced between lines between adjacent paths PS and between manufacturing material layers when laminating manufacturing material layers formed with a plurality of paths PS.

Accordingly, an object of the present disclosure is to provide a fiber-reinforced resin strand that may improve manufacturing accuracy during curve manufacturing and improve fusibility between strands with an excellent spread property, and may prevent a decrease in strength of a manufactured object.

Solution to Problems

Advantageous Effects of Invention

The present disclosure contains the following embodiments.

(1) A fiber-reinforced resin strand used as a manufacturing material for a 3D printer, the fiber-reinforced resin strand containing:
a base material containing a thermoplastic resin; and
at least one fiber or fiber bundle disposed in the base material and extending in a strand-axial direction, wherein
twisting is applied to the fiber or the fiber bundle along the strand-axial direction, and
the number of times of the twisting per 1 m in length of the fiber-reinforced resin strand in the strand-axial direction is 30 or more and 80 or less.

(2) An additive manufacturing method containing: manufacturing a manufactured object by fused deposition modeling using a fiber-reinforced resin strand, the fiber-reinforced resin strand containing: a base material containing a thermoplastic resin; and at least one fiber or fiber bundle disposed in the base material and extending in a strand-axial direction, twisting being applied to the fiber or the fiber bundle along the strand-axial direction, and the number of times of the twisting per 1 m in length of the fiber-reinforced resin strand in the strand-axial direction being 30 or more and 80 or less.

According to the present disclosure, the manufacturing accuracy during curve manufacturing may be improved, the fusibility between strands may be improved with an excellent spread property, and the strength reduction of the manufactured object may be prevented.

BRIEF DESCRIPTION OF DRAWINGS

Figure 4:
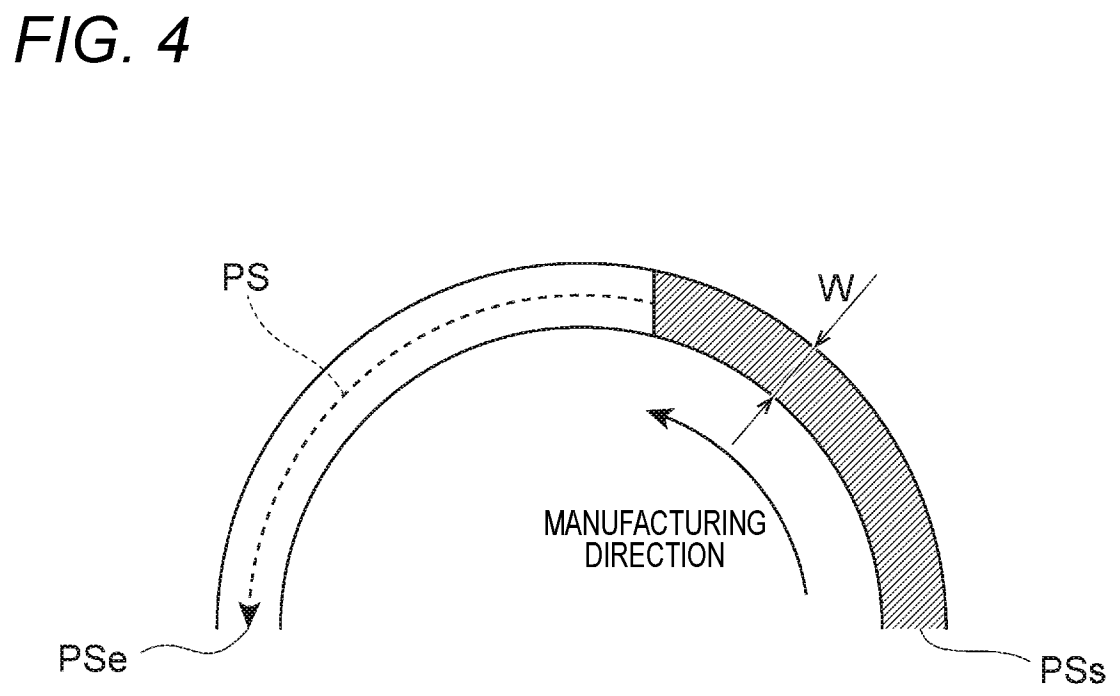

FIG. 4 is a diagram showing an ideal manufacturing state of a manufacturing material.

DESCRIPTION OF EMBODIMENTS

Hereinafter, embodiments of the present disclosure will be described in detail with reference to the drawings.

<Fiber-Reinforced Resin Strand>

Figure 1:
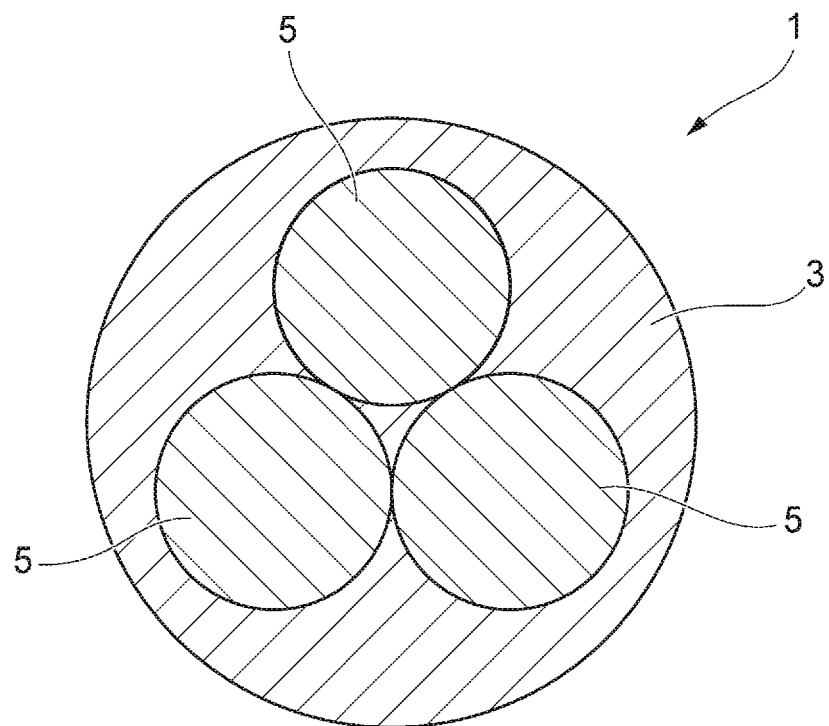
FIG. 1 is a schematic perspective view showing a fiber-reinforced resin strand.

FIG. 1 is a schematic perspective view showing a fiber-reinforced resin strand 1. The fiber-reinforced resin strand (hereinafter, also referred to as a "strand") 1 is used as a manufacturing material for manufacturing a manufactured object, and is a continuous linear resin material containing reinforcing fibers.

The strand 1 includes a base material 3 containing a thermoplastic resin, and at least one fiber bundle 5 that is disposed so as to be impregnated in the base material 3 and extends continuously in an axial direction of the strand 1 (a strand-axial direction). The fiber bundle 5 is obtained by twisting and bundling a large number of reinforcing fibers, and twisting is applied to the fiber bundle 5 along the strand-axial direction. When there are a plurality of fiber bundles 5, each fiber bundle 5 is disposed in a spiral shape along a central axis of the strand 1. The strand may include at least one fiber instead of the fiber bundle 5. At least one fiber means a fiber or fibers. At least one fiber bundle means a fiber bundle or fiber bundles.

The twisting applied to the fiber or fiber bundle 5 is such that the number of times of the twisting per 1 m in the length of the strand 1 in the strand-axial direction is 30 or more and 80 or less. The fiber bundle 5 includes 1000 or more and 1500 or less fibers.

As the reinforcing fibers of the fiber bundles 5 constituting the strand 1, organic fibers such as a polyethylene fiber, an aramid fiber, and a Xyron fiber, and inorganic fibers such as a boron fiber, a glass fiber, a carbon fiber, a metal fiber, and a rock fiber may be used. As the reinforcing fiber, a fiber that has been subjected to a surface treatment may be used in order to improve adhesion strength between the resin and the fiber.

As the thermoplastic resin contained in the base material 3, polyolefin-based resins such as polypropylene or polyethylene, acrylonitrile-butadiene-styrene resins, polystyrene resins, polyester-based resins such as polyethylene terephthalate, polybutylene terephthalate, or polylactic acid, polyamide-based resins, aromatic polyamide-based resins, polyetherimide, polyarylimide, polyarylate, polyether ether ketone, polyaryletherketone, polybenzimidazole, polyethersulfone, polysulfone, polyvinylidene fluoride resins, liquid crystal polymers, polycarbonate resins, polyacetal, polyphenylene sulfide and the like may be used.

These thermoplastic resins may be used alone, and a thermoplastic resin in which a plurality of these resins is blended may be used in order to improve heat resistance, heat distortion temperature, heat aging resistance, tensile properties, bending properties, creep properties, compression properties, fatigue properties, impact properties, and sliding properties of the thermoplastic resin. Examples of the thermoplastic resin include polyetheretherketone resin (PEEK)/polytetrafluoroethylene (PTFE) and PEEK/polybenzimidazole (PBI). The thermoplastic resin may be obtained by adding short fibers such as a carbon fiber and a glass fiber, talc, or the like to a resin.

By adding phenolic antioxidants, thioether-based antioxidants, or phosphite-based antioxidants, benzotriazole-based ultraviolet absorbers or triazine-based ultraviolet absorbers, hydrazide-based metal deactivating agents or amide-based metal deactivating agents, or the like to the thermoplastic resin, durability of the manufactured object may be improved.

By adding a phthalic acid-based plasticizer or polyester-based plasticizer to the thermoplastic resin, the flexibility may be improved, and the manufacturing accuracy during manufacturing and the flexibility of the manufactured object may be improved.

By adding a halogen-based flame retardant, phosphate ester-based flame retardant, inorganic flame retardant, or intumescent flame retardant to the thermoplastic resin, the flame retardancy of the manufactured object may be improved.

By adding a phosphate ester metal salt-based core material or sorbitol-based core material to the thermoplastic resin, the thermal expansion during the manufacturing may be controlled, and the manufacturing accuracy may be improved.

By adding a non-ionic-based permanent antistatic agent, anionic-based permanent antistatic agent, and cationic-based permanent antistatic agent to the thermoplastic resin, the antistatic property of the manufactured object may be improved.

By adding a hydrocarbon-based lubricant or metal soap-based lubricant to the thermoplastic resin to improve the slidability of the continuous fiber-reinforced strand, the strand may be smoothly supplied during the manufacturing.

<Manufacturing Apparatus for Fiber-Reinforced Resin Strand>

Next, a manufacturing apparatus for the strand 1 will be described.

Figure 2:
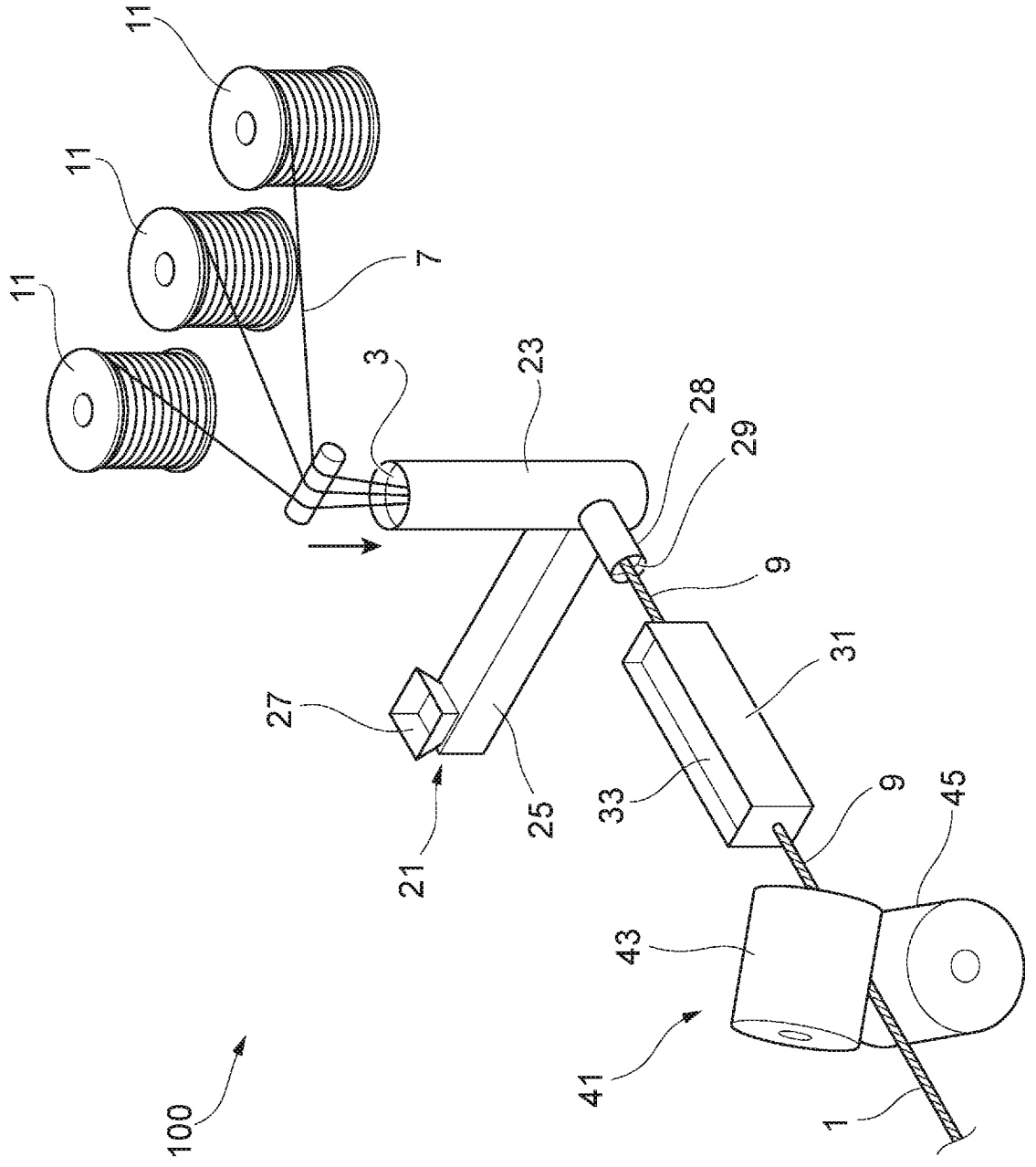
FIG. 2 is a schematic configuration diagram showing a manufacturing apparatus of the fiber-reinforced resin strand.

FIG. 2 is a schematic configuration diagram showing a manufacturing apparatus 100 for the fiber-reinforced resin strand 1. The manufacturing apparatus 100 includes a plurality of (three in FIG. 2) fiber material supply units 11 that feed a fiber material 7 wound in a coil shape at a predetermined speed, a kneading extruder 21 that kneads and melts the base material 3, and a resin bath unit 23 that impregnates the fiber material 7 fed from the fiber material supply unit 11 with the base material 3 plasticized by the kneading extruder 21.

The manufacturing apparatus 100 further includes a cooling unit 31 that is disposed downstream of the resin bath unit 23 and cools the impregnated fiber material 7 sent out from the resin bath unit 23, and a twisting unit 41 that is disposed downstream of the cooling unit 31 and mainly applies twisting to the fiber material 7 before cooling around an axis center.

The kneading extruder 21 is rotatably provided with a screw shaft (not shown) having a kneading blade in a chamber 25 having a cavity therein, and melts and plasticizes the base material 3 fed from a hopper 27.

The resin bath unit 23 is formed in a cylindrical shape with a cylinder-axis direction extending up and down, and the base material 3 plasticized by the kneading extruder 21 is supplied and stored inside the cylinder. An upper end portion of the resin bath unit 23 is opened, and the fiber material 7 may be drawn into the base material 3 stored in the resin bath unit 23 from the upper end opening.

Although not shown, inside the resin bath unit 23, a plurality of (for example, four) impregnation rollers are provided which are rotatably held with axes thereof oriented in a horizontal direction, and the fiber material 7 is sequentially laid over these impregnation rollers so as to meander from top to bottom. The twisting is applied to the fiber material 7 at least downstream of the lowermost impregnation roller among the plurality of impregnation rollers.

At a lower end portion of the resin bath unit 23, an outlet portion 28 for drawing out the impregnated fiber material 9 to the outside is provided. The outlet portion 28 is provided with a die 29 for shaping the base material 3 in a state of covering the fiber material 7 to form a cross-sectional shape.

The cooling unit 31 is a water tank elongated in a direction in which the impregnated fiber material 9 is drawn out from the resin bath unit 23, and cooling water 33 is stored in the tank. An inlet portion for introducing the impregnated fiber material 9 is provided in a tank wall that is closest to and faces the outlet portion 28 (the die 29) of the resin bath unit 23, and an outlet portion for discharging the impregnated fiber material 9 is provided in a tank wall that is farthest from the inlet portion. Therefore, in the cooling unit 31, the base material 3 impregnating and covering the fiber material 7 may be cooled and cured in the cooling water 33.

As the twisting unit 41 disposed downstream of the cooling unit 31, various mechanisms and the like may be employed. For example, although not shown, a mechanism that rotates a bobbin for winding the strand 1 around an axis of the strand 1 may be employed as the twisting unit 41. On the other hand, as shown in FIG. 2, for example, as the twisting unit 41, a configuration may be employed in which a pair of upper take-up roller 43 and lower take-up roller 45 with outer peripheral surfaces thereof brought into contact with each other is provided in a vertical direction. The take-up roller 43 and the take-up roller 45 are rotatable in mutually different rotational directions such that the impregnated fiber material 9 sent out from the cooling unit 31 is sandwiched in an opposed manner and sent further downstream.

That is, the pair of upper take-up roller 43 and lower take-up roller 45 of the twisting unit 41 have a function of drawing the fiber material 9 from the fiber material supply unit 11 to the resin bath unit 23, and further drawing out the impregnated fiber material 9 from the resin bath unit 23 to the cooling unit 31 and the twisting unit 41. The take-up roller 43 and the take-up roller 45 constitute a take-up unit for the fiber material 9 and the strand 1 in the manufacturing apparatus 1. A winding unit (not shown) may be separately provided downstream of the twisting unit 41 to wind the obtained strand 1 on a bobbin or the like.

The pair of upper take-up roller 43 and lower take-up roller 45 are disposed so as to face a direction inclined with respect to a take-up direction of the impregnated fiber material 9, and the take-up roller 43 and the take-up roller 45 are oriented in different directions at the same angle. That is, a rotational axis of the upper take-up roller 45 and a rotational axis of the lower take-up roller 43 intersect in a symmetrical X shape centered on a take-up axis of the impregnated fiber material 9 when viewed from above.

According to the manufacturing apparatus 100 described above, a strand in which the twisting is applied to the fiber or fiber bundle along the strand-axial direction, the fiber bundle has 1000 or more fibers, and the number of times of twisting per 1 m in the length of the strand in the strand-axial direction is 30 or more and 80 or less may be manufactured.

<Additive Manufacturing Apparatus Using Fiber-Reinforced Resin Strand>

Next, as an example of a 3D printer using, as a manufacturing material, the fiber-reinforced resin strand 1 to which the twisting described above is applied, a configuration of an additive manufacturing apparatus using fused deposition modeling (FDM) will be described.

Figure 3:
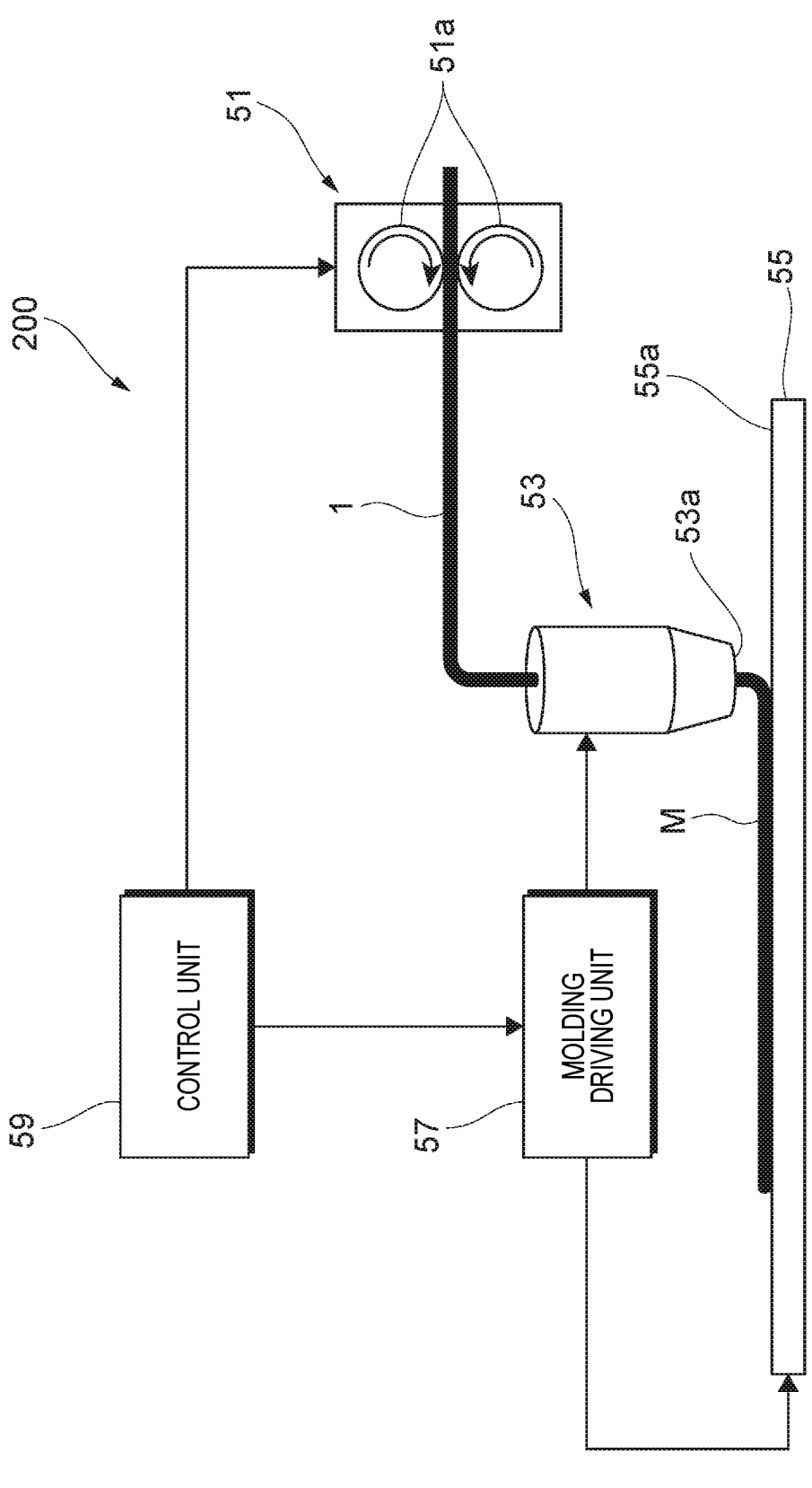
FIG. 3 is a schematic configuration diagram showing an additive manufacturing apparatus using FDM.

FIG. 3 is a schematic configuration diagram showing an additive manufacturing apparatus 200 using FDM. The additive manufacturing apparatus 200 includes a strand feeding unit 51 that feeds the strand 1, a head unit 53, a manufacturing table 55, a molding driving unit 57, and a control unit 59.

The strand feeding unit 51 includes a pair of driving rollers 51a that sandwich the strand 1, and a driving unit (not shown) such as a motor that rotationally drives at least one of the driving rollers 51a.

The head unit 53 includes a heating unit (not shown) that thermally dissolves the fed strand 1, and a nozzle 53a that ejects the manufacturing material dissolved by the heating unit. Although not shown, a cutting unit such as a cutter or a laser cutting device that cuts the reinforcing fibers contained in the strand 1 may be provided.

The manufacturing table 55 is disposed to face the nozzle 53a of the head unit 53, and has a manufacturing surface 55a on which the manufactured object is laminated.

The molding driving unit 57 relatively moves the head unit 53 and the manufacturing table 55 to form a manufacturing material M ejected from the nozzle 53a of the head unit 53 along a desired path. For example, the molding driving unit 57 may include a biaxial driving mechanism that moves the head unit 53 within the plane of the manufacturing surface 55a of the manufacturing table 55, and a raising and lowering mechanism that adjusts a laminating height by raising and lowering the manufacturing table 55.

The control unit 59 has a function of controlling the feeding of the strand 1 by the strand feeding unit 51 and the relative movement of the head unit 53 and the manufacturing table 55 by the molding driving unit 57, and a function of collectively controlling other units. The control unit 59 receives a program for controlling units including the strand feeding unit 51 and the molding driving unit 57, and executes the program to additive manufacture a manufactured object having a desired shape. The control unit 59 is implemented by a computer including a processor such as a CPU, a memory such as a ROM and a RAM, a storage such as a hard disk drive HDD and a solid state drive SSD, and the like.

Figure 5:
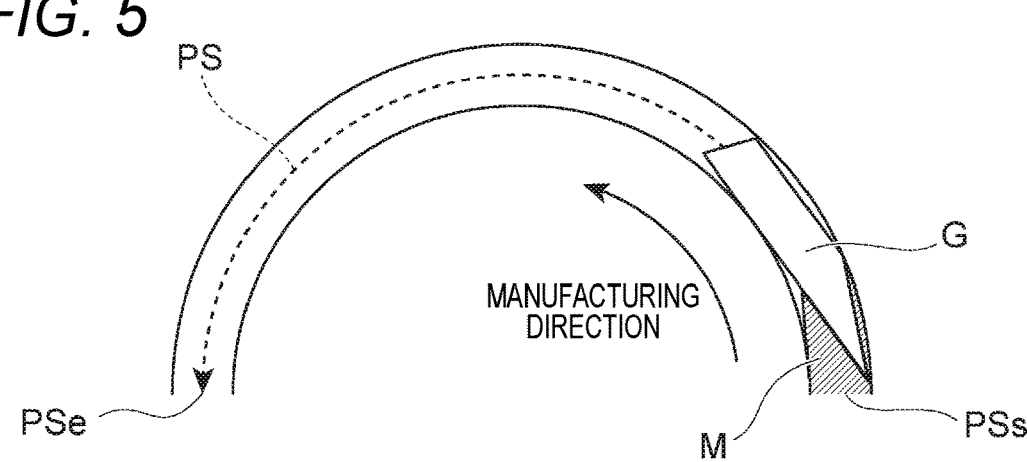
FIG. 5 is a diagram showing a manufacturing state in which a fold occurs in a curved portion of a manufacturing material in the related art.
Figure 6:
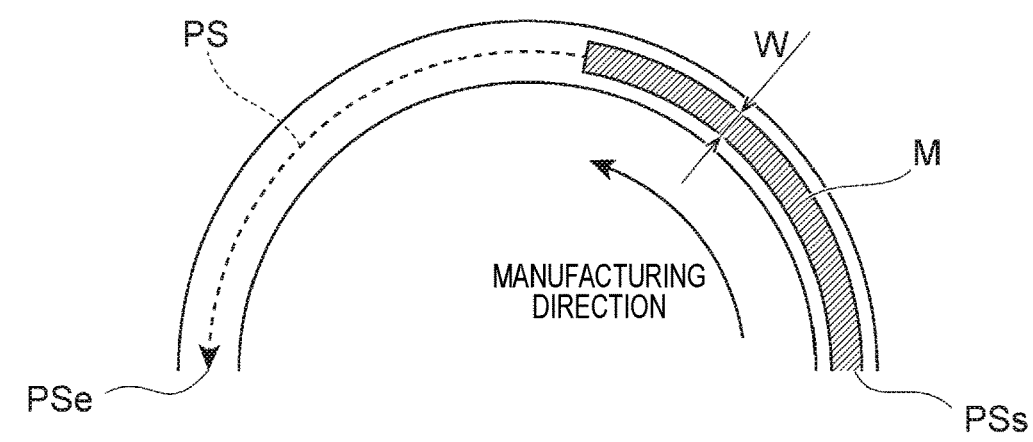
FIG. 6 is a diagram showing a manufacturing state in which a spread width is reduced in the curved portion of the manufacturing material in the related art.
Figure 7:
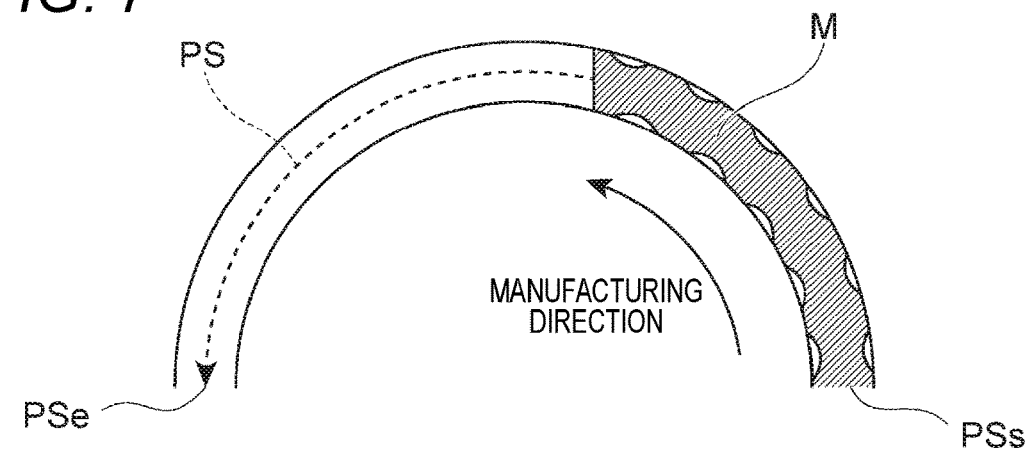
FIG. 7 is a diagram showing a manufacturing state in which the spread width is destabilized in the curved portion of the manufacturing material in the related art.

In a case where manufacturing is performed using the strand 1 described above as a manufacturing material by the additive manufacturing apparatus 200 having the present configuration, a fold of the fiber as shown in FIG. 5 does not occur, for example, when a manufactured object is manufactured with a path that changes continuously in a range of a curvature radius of 2 mm to 40 mm. Reduction of the spread width as shown in FIG. 6 and destabilization of the spread width as shown in FIG. 7 are not caused. Accordingly, the deviation from the set path may be minimized, and the manufacturing accuracy may be improved.

When a spread width of an untwisted strand without twisting is used as a reference, the spread width of the manufacturing material M during manufacturing using the strand 1 described above has a reduction rate of 10% or less. Further, the tensile properties of the strand 1 alone are properties including the maximum value of tensile elastic modulus and tensile strength at least within a range where the twisting number is within 100 times/m.

From the experimental findings, within a range where the number of times of twisting of the strand 1 is 30 times/m or more and 80 times/m or less, particularly remarkable excellent properties are exhibited. The fiber bundle includes 1000 or more fibers, and 12000 or less fibers, preferably 6000 or less fibers, more preferably 3000 or less fibers, and even more preferably 1500 or less fibers.

EXAMPLE

Test Examples 1 and 2

UBE Nylon (registered trademark) UBE Nylon 1010X1 manufactured by Ube Industries, Ltd. was used as a thermoplastic resin, and one Torayca (registered trademark) T300B-1000-50B manufactured by Toray Industries, Inc. was used as a reinforcing fiber to produce a fiber-reinforced resin strand (cross-sectional diameter: 0.3 mm$\varphi$) having a fiber weight content of 70%. In the production of the fiber-reinforced resin strand, a composite obtained by impregnating the fiber material 7 with the thermoplastic resin in a molten state using the manufacturing apparatus 100 as shown in FIG. 2 was twisted by using the pair of take-up rollers 43 and 45 of the twisting unit 41 and adjusting a twisting angle to 2° and 4° with respect to a take-up direction, and thus twisting was applied to the composite. The number of times of twisting N per 1 m of the strand is a value calculated from the twisting angle $\theta$ described above and a strand cross-sectional diameter D based on the following equation (1), and is calculated to be about 37 times/m when the twisting angle $\theta$ is 2° and about 74 times/m when the twisting angle $\theta$ is 4°.

$$N=\tan \theta/(\pi D) \qquad \text{Equation (1)}$$

Accordingly, strands of Test Example 1 (twisting angle $\theta$: 2°, the number of times of twisting N: 37 times/m) and Test Example 2 (twisting angle $\theta$: 4°, the number of times of twisting N: 74 times/m) were formed. As for the number of fibers in the fiber bundle, a product with a prescribed number of 1000 fibers is used.

In the strand having the present configuration, twisting of 18.5 times/m per twisting angle of 1° is applied to the strand by the take-up rollers 43 and 45. Therefore, considering an error between a set twisting angle and an actual twisting angle, it is considered that the twisting number has a certain range. For example, the lower limit is calculated to be the number of times of twisting N of 28 times/m when the twisting angle is 1.5°, and the upper limit is calculated to be the number of times of twisting N of 82 times/m when the twisting angle is 4.4°.

From the above, a range of the number of times of twisting N in Test Examples 1 and 2 can be considered to be in a range of 30 times/m or more and 80 times/m or less in consideration of the above-described error.

Test Example 3

A strand of Test Example 3 was formed in the same manner as in Test Examples 1 and 2, except that the take-up rollers 43 and 45 of the twisting unit 41 were not inclined with respect to the take-up direction and the twisting angle $\theta$ was changed to 0° (the number of times of twisting N: 0 times/m).

Test Example 4

A strand of Test Example 4 was formed in the same manner as in Test Examples 1 to 3, except that an inclination angle of the pair of take-up rollers with respect to the take-up direction was changed such that the twisting angle $\theta$ was 6° and the number of times of twisting N was about 111 times/m.

(Evaluation of Manufacturing Accuracy)

The obtained strands of Test Examples 1 to 4 were used as filaments for a 3D printer, and a manufactured object composed of one layer was obtained under manufacturing conditions of a nozzle temperature of 260° C., a table temperature of 45° C., and a printing speed of 8 mm/sec. A manufactured model was a curved manufactured object, and had an elliptical shape having a major axis radius of 15 mm and a minor axis radius of 6 mm, with a curvature radius continuously changing in a range of 2 mm to 40 mm. This simulates looser and harsher conditions in a curve formability test. The manufacturing accuracy of the obtained manufactured object was evaluated as an amount of deviation from the set manufacturing path by analysis using a laser microscope and image processing software. Here, a case where the deviation from the set manufacturing path was less than 1% was evaluated as "A", and a case where the deviation was more than 1% was evaluated as "B".

(Spread Property)

The strands of Test Examples 1 to 4 were used to make a straight line under manufacturing conditions same as those described above to obtain a spread property evaluation sample. An average value of widths of linear manufactured objects (the manufacturing materials M) was calculated by observation with a laser microscope and image processing by image processing software, and the calculated value was used as the spread width. Using a sample having the largest spread width under the same manufacturing conditions as a reference, a case where a reduction rate of the spread width was within 10% was evaluated as "A", and a case where the reduction rate was 10% or more was evaluated as "B".

(Porosity)

Using the strands of Test Examples 1 to 4 and under manufacturing conditions same as those for the above evaluation, a manufactured object was obtained in which one layer of an elliptical shape having a major axis radius of 15 mm and a minor axis radius of 6 mm, with a curvature radius continuously changing in a range of 2 mm to 40 mm was manufactured four times toward the inside. The obtained manufactured object was observed with a laser microscope, and the porosity between the manufacturing paths was calculated by image processing using image processing software. As for the porosity, a case where the porosity in all the manufacturing paths was less than 2% was evaluated as "A", and a case where the porosity in all the manufacturing paths was 2% or more was evaluated as "B".

(Mechanical Property)

Each of the strands of Test Examples 1 to 3 was cut into a length of 250 mm, a tab of 25 mm×50 mm was bonded to both ends, and a tensile test was performed under a condition that a gauge length for measuring the elongation was 50 mm. A case where the tensile strength at break was 1200 MPa or more was evaluated as "A", and a case where the tensile strength was less than 1200 MPa was evaluated as "B". The evaluation results of each of the above test examples are shown in Table 1.

TABLE 1

| | Manufacturing accuracy | | | Spread property | | Porosity | | Mechanical property | | |
|---|---|---|---|---|---|---|---|---|---|---|
| | Fiber weight content [%] | Deviation [%] | Evaluation | Width | Evaluation | Void [%] | Evaluation | Elastic modulus [GPa] | Strength [MPa] | Evaluation |
| Test Example 1 | 70.5 | 0.2 | A | 1080 | A | 1.62 | A | 130 | 1570 | A |
| Test Example 2 | 70.4 | 0.8 | A | 1000 | A | 1.02 | A | 128 | 1450 | A |
| Test Example 3 | 69.8 | 1.4 | B | 1100 | — | 3.96 | B | 106 | 1130 | B |
| Test Example 4 | 72.3 | 2.0 | B | 930 | B | 1.50 | A | — | — | — |

As in Test Examples 1 and 2, in the strands obtained by impregnating the fiber material with the base material containing a thermoplastic resin as a main component and applying the twisting with a twisting number N of 37 times/m (Test Example 1) and 74 times/m (Test Example 2), high mechanical properties were exhibited while high flexibility specific to the twisted strands was maintained. It is shown that the strands of Test Examples 1 and 2 may be manufactured with high manufacturing accuracy, excellent spread property, and low porosity when manufacturing the manufactured object with the additive manufacturing apparatus as shown in FIG. 3.

On the other hand, in Test Examples 3 and 4, in the strands to which the twisting with the number of times of twisting N of 0 times/m (Test Example 3) and about 111 times/m (Test Example 4) were applied, both the manufacturing accuracy and the spread property were lower than those of Test Examples 1 and 2, and the mechanical properties of Test Example 3 were lower than those of Test Examples 1 and 2. It is confirmed that the mechanical properties of Test Example 4 are lower than those of Test Examples 1 and 2 when tested with samples having substantially the same number of times of twisting.

As described above, when the number of times of twisting N is 30 times/m or more and 80 times/m or less, particularly remarkable excellent properties are exhibited in the case of manufacturing with a curved path having a curvature radius of 2 mm to 40 mm. Further, by making the number of fibers in the fiber bundle 1000 or 1000 or more, the above-described manufacturing accuracy, spread property, and mechanical properties are synergistically improved, and particularly good properties may be obtained.

As described above, the present disclosure is not limited to the above-described embodiments, and combinations of the respective configurations of the embodiments and changes and applications made by those skilled in the art based on the description of the specification and well-known techniques are also intended for the present disclosure and are included in the scope of protection.

As described above, the present specification discloses the following matters.

(1) A fiber-reinforced resin strand used as a manufacturing material for a 3D printer, the fiber-reinforced resin strand including:

a base material containing a thermoplastic resin; and at least one fiber or fiber bundle disposed in the base material and extending in a strand-axial direction, in which twisting is applied to the fiber or the fiber bundle along the strand-axial direction, and the number of times of the twisting per 1 m in length of the strand in the strand-axial direction is 30 or more and 80 or less.

According to the fiber-reinforced resin strand, by setting the number of times of the twisting of the fiber or the fiber bundle to 30 times/m or more and 80 times/m or less, the manufacturing accuracy during curve manufacturing is improved and good spread property is obtained when the manufactured object is manufactured by the 3D printer. Accordingly, the fusibility between the strands may be improved and a decrease in strength of the manufactured object may be prevented.

(2) The fiber-reinforced resin strand according to (1), in which the fiber bundle includes 1000 or more and 1500 or less fibers.

According to the fiber-reinforced resin strand, even a manufactured object that continuously changes with a small curvature radius may be manufactured with high accuracy by preventing the deviation from the set manufacturing path.

(3) An additive manufacturing method including: manufacturing a manufactured object by fused deposition modeling using a fiber-reinforced resin strand, the fiber-reinforced resin strand including: a base material containing a thermoplastic resin; and at least one fiber or fiber bundle disposed in the base material and extending in a strand-axial direction, twisting being applied to the fiber or the fiber bundle along the strand-axial direction, and the number of times of the twisting per 1 m in length of the strand in the strand-axial direction being 30 or more and 80 or less.

According to the additive manufacturing method, by using the fiber-reinforced resin strand in which the number of times of the twisting of the fiber or the fiber bundle is set to 30 times/m or more and 80 times/m or less, the manufacturing accuracy during curve manufacturing is improved and the good spread property is obtained when the manufactured object is manufactured by the 3D printer. Accordingly, the fusibility between the strands may be improved and a decrease in strength of the manufactured object may be prevented.

(4) The additive manufacturing method according to (3), in which the fiber bundle includes 1000 or more and 1500 or less fibers.

According to the additive manufacturing method, even a manufactured object that continuously changes with a small curvature radius may be manufactured with high accuracy by preventing the deviation from the set manufacturing path.

(5) The additive manufacturing method according to (3), in which a path for manufacturing along a curve line having a curvature radius of 2 mm or more and 40 mm or less is provided.

According to the additive manufacturing method, even in a curved path having a curvature radius of 2 mm or more and 40 mm or less, good manufacturing may be performed without causing a fold of the fiber, the reduction of the spread width, and the destabilization.

What is claimed is:

1. A fiber-reinforced resin strand used as a manufacturing material for a 3D printer, the fiber-reinforced resin strand comprising:

a base material containing a thermoplastic resin; and at least one fiber or fiber bundle disposed in the base material and extending in a strand-axial direction, wherein the fiber or the fiber bundle is twisted along the strand-axial direction, the number of twists per 1 m in length of the fiber-reinforced resin strand in the strand-axial direction is 30 or more and 80 or less, and an angle of the twisting relative to the strand-axial direction is 1° or more and 2° or less.

2. The fiber-reinforced resin strand according to claim 1, wherein the fiber bundle includes 1000 or more and 1500 or less fibers.

3. An additive manufacturing method comprising:

manufacturing a manufactured object by fused deposition modeling using a fiber-reinforced resin strand, the fiber-reinforced resin strand comprising: a base material containing a thermoplastic resin; and at least one fiber or fiber bundle disposed in the base material and extending in a strand-axial direction, twisting being applied to the fiber or the fiber bundle along the strand-axial direction, the number of times of the twisting per 1 m in length of the fiber-reinforced resin strand in the strand-axial direction being 30 or more and 80 or less, and an angle of the twisting relative to the strand-axial direction is 1° or more and 2° or less.

4. The additive manufacturing method according to claim 3, wherein the fiber bundle includes 1000 or more and 1500 or less fibers.

5. The additive manufacturing method according to claim 3, wherein a path for manufacturing along a curve line having a curvature radius of 2 mm to 40 mm is provided.

* * * * *